United States Patent
Marathe et al.

(10) Patent No.: US 9,710,275 B2
(45) Date of Patent: Jul. 18, 2017

(54) SYSTEM AND METHOD FOR ALLOCATING MEMORY OF DIFFERING PROPERTIES TO SHARED DATA OBJECTS

(71) Applicant: Nvidia Corporation, Santa Clara, CA (US)

(72) Inventors: Jaydeep Marathe, Santa Clara, CA (US); Yuan Lin, Santa Clara, CA (US); Gautam Chakrabarti, Santa Clara, CA (US); Okwan Kwon, West Lafayette, IN (US); Amit Sabne, West Lafayette, IN (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 13/724,089

(22) Filed: Dec. 21, 2012

(65) Prior Publication Data

US 2014/0129783 A1    May 8, 2014

Related U.S. Application Data

(60) Provisional application No. 61/722,661, filed on Nov. 5, 2012.

(51) Int. Cl.
*G06F 12/02* (2006.01)
*G06F 9/38* (2006.01)
(Continued)

(52) U.S. Cl.
CPC ............... *G06F 9/38* (2013.01); *G06F 8/40* (2013.01); *G06F 9/30134* (2013.01);
(Continued)

(58) Field of Classification Search
CPC .... G06F 12/02; G06F 12/084; G06F 12/0811; G06F 12/0815; G06F 12/0831
(Continued)

(56) References Cited

U.S. PATENT DOCUMENTS 5,875,464 A * 2/1999 Kirk .................... G06F 12/1054
                                                        711/121
6,088,770 A * 7/2000 Tarui .................. G06F 12/0284
                                                        711/141
(Continued)

FOREIGN PATENT DOCUMENTS

CN           1725176 A      1/2006
CN         101176066 A      5/2008
(Continued)

OTHER PUBLICATIONS

McCarthy Thomas, The Very Basic of Garbage Collection. Aug. 26, 2008.*

(Continued)

*Primary Examiner* — Midys Rojas
*Assistant Examiner* — Khoa D Doan
(74) *Attorney, Agent, or Firm* — Kevin Brown; Parker Justiss, P.C.

(57) ABSTRACT

A system and method for allocating shared memory of differing properties to shared data objects and a hybrid stack data structure. In one embodiment, the system includes: (1) a hybrid stack creator configured to create, in the shared memory, a hybrid stack data structure having a lower portion having a more favorable property and a higher portion having a less favorable property and (2) a data object allocator associated with the hybrid stack creator and configured to allocate storage for shared data object in the lower portion if the lower portion has a sufficient remaining capacity to contain the shared data object and alternatively allocate storage for the shared data object in the higher portion if the lower portion has an insufficient remaining capacity to contain the shared data object.

12 Claims, 3 Drawing Sheets

(51) Int. Cl.
*G06F 12/0853* (2016.01)
*G06F 9/30* (2006.01)
*G06F 9/45* (2006.01)
*G06F 9/52* (2006.01)
*G06F 9/50* (2006.01)

(52) U.S. Cl.
CPC .............. *G06F 9/5016* (2013.01); *G06F 9/52* (2013.01); *G06F 9/522* (2013.01); *G06F 12/02* (2013.01); *G06F 12/0853* (2013.01); *G06F 2212/451* (2013.01)

(58) Field of Classification Search
USPC .................................................. 711/147, 153
See application file for complete search history.

(56) References Cited

U.S. PATENT DOCUMENTS

| | | | |
|---|---|---|---|
| 6,609,193 B1 | 8/2003 | Douglas et al. | |
| 7,086,063 B1* | 8/2006 | Ousterhout | G06F 8/45 711/118 |
| 7,856,541 B2* | 12/2010 | Kaneda | G06F 3/0605 711/100 |
| 8,095,782 B1* | 1/2012 | Danskin | G06F 9/461 712/228 |
| 8,250,555 B1 | 8/2012 | Lee et al. | |
| 8,335,892 B1* | 12/2012 | Minkin | G06F 12/084 710/6 |
| 8,397,013 B1* | 3/2013 | Rosenband | G06F 13/385 365/205 |
| 8,516,483 B2 | 8/2013 | Chinya et al. | |
| 8,547,385 B2 | 10/2013 | Jiao | |
| 8,615,646 B2 | 12/2013 | Nickolls et al. | |
| 8,683,132 B1* | 3/2014 | Danilak | G06F 12/0862 711/119 |
| 8,812,771 B2* | 8/2014 | Yim | G06F 12/0246 710/52 |
| 2002/0029357 A1 | 3/2002 | Charnell et al. | |
| 2003/0018684 A1 | 1/2003 | Ohsawa et al. | |
| 2005/0125774 A1 | 6/2005 | Barsness et al. | |
| 2005/0149903 A1* | 7/2005 | Archambault | G06F 9/5016 717/100 |
| 2006/0095675 A1* | 5/2006 | Yang | G06F 9/30134 711/132 |
| 2007/0136523 A1* | 6/2007 | Bonella | G06F 9/4401 711/113 |
| 2007/0143582 A1 | 6/2007 | Coon et al. | |
| 2007/0192541 A1* | 8/2007 | Balasubramonian | G06F 12/0893 711/118 |
| 2007/0294512 A1 | 12/2007 | Crutchfield et al. | |
| 2008/0052466 A1* | 2/2008 | Zulauf | G06F 12/0862 711/125 |
| 2008/0126716 A1* | 5/2008 | Daniels | G06F 12/0875 711/154 |
| 2008/0158958 A1* | 7/2008 | Sokolov | G11C 16/26 365/185.08 |
| 2009/0006758 A1* | 1/2009 | Chung | G06F 12/0811 711/129 |
| 2009/0013323 A1 | 1/2009 | May et al. | |
| 2009/0031290 A1 | 1/2009 | Feng et al. | |
| 2009/0100244 A1* | 4/2009 | Chang | G06F 12/0246 711/172 |
| 2009/0259799 A1* | 10/2009 | Wong | G06F 12/0207 711/103 |
| 2010/0079454 A1 | 4/2010 | Legakis et al. | |
| 2010/0169540 A1* | 7/2010 | Sinclair | G06F 12/0246 711/103 |
| 2010/0281230 A1* | 11/2010 | Rabii | G06F 3/0605 711/165 |
| 2011/0022672 A1 | 1/2011 | Chang et al. | |
| 2011/0072214 A1* | 3/2011 | Li | G06F 12/0848 711/124 |
| 2011/0072438 A1 | 3/2011 | Fiyak et al. | |
| 2011/0125974 A1* | 5/2011 | Anderson | G06F 12/084 711/153 |
| 2011/0191522 A1* | 8/2011 | Condict | G06F 12/123 711/103 |
| 2011/0265068 A1 | 10/2011 | Elnozahy et al. | |
| 2011/0320804 A1* | 12/2011 | Chan | G06F 12/0862 713/150 |
| 2012/0072652 A1* | 3/2012 | Celis | G06F 12/121 711/103 |
| 2012/0089792 A1 | 4/2012 | Fahs et al. | |
| 2012/0131309 A1 | 5/2012 | Johnson et al. | |
| 2012/0137055 A1* | 5/2012 | Lee | G06F 12/0223 711/103 |
| 2012/0137099 A1* | 5/2012 | Shibayama | G06F 3/0605 711/165 |
| 2012/0151179 A1* | 6/2012 | Gaertner | G06F 12/0284 711/206 |
| 2012/0191953 A1 | 7/2012 | Eichenberger et al. | |
| 2012/0204065 A1 | 8/2012 | Tsafrir et al. | |
| 2012/0254530 A1* | 10/2012 | Tagaya | G06F 12/06 711/105 |
| 2013/0128671 A1* | 5/2013 | Shin | G11C 16/10 365/185.18 |
| 2013/0263153 A1 | 10/2013 | Gschwind | |
| 2014/0007114 A1 | 1/2014 | Wang et al. | |
| 2014/0059277 A1* | 2/2014 | Chung | G06F 3/0604 711/103 |
| 2014/0068383 A1* | 3/2014 | Cheng | G06F 12/00 714/773 |
| 2014/0129812 A1 | 5/2014 | Chakrabarti et al. | |
| 2014/0130021 A1 | 5/2014 | Lin et al. | |
| 2014/0130052 A1 | 5/2014 | Lin et al. | |

FOREIGN PATENT DOCUMENTS

| | | |
|---|---|---|
| CN | 101819675 A | 9/2010 |
| TW | 201140447 A | 11/2011 |
| TW | 201220246 A | 5/2012 |

OTHER PUBLICATIONS

Chen Dehao, Tree Partition based Parallel Frequent Pattern mining on Shared Memory Systems, Apr. 25, 2006, IEEE.*
McCarthy, The Very Basic of Garbage Collection, Aug. 26, 2008.*
Steffen, Michael, et al., "Improving SIMT Efficiency of Global Rendering Algorithms with Architectural Support for Dynamic Micro-Kernels", 2010, 43rd Annual IEEE/ACM International Symposium on Microarchitecture, 12 pages.
Meng, Jiayuan, et al., "Dynamic Warp Subdivision for Integrated Branch and Memory Divergence Tolerance", Jun. 2010, 12 pages.
Reyes, Ruyman, et al., "accULL: An OpenACC Implementation with CUDA and OpenCL Support", 2012, 12 pages.

* cited by examiner

SYSTEM AND METHOD FOR ALLOCATING MEMORY OF DIFFERING PROPERTIES TO SHARED DATA OBJECTS

CROSS-REFERENCE TO RELATED APPLICATION

This application claims the benefit of U.S. Provisional Application Ser. No. 61/722,661, filed by Lin, et al., on Nov. 5, 2012, entitled "Executing Sequential Code Using a Group of Threads," commonly assigned with this application and incorporated herein by reference.

TECHNICAL FIELD

This application is directed, in general, to parallel processors and, more specifically, to a system and method for allocating memory of differing properties to shared data objects.

BACKGROUND

As those skilled in the pertinent art are aware, applications may be executed in parallel to increase their performance. Data parallel applications carry out the same process concurrently on different data. Task parallel applications carry out different processes concurrently on the same data. Static parallel applications are applications having a degree of parallelism that can be determined before they execute. In contrast, the parallelism achievable by dynamic parallel applications can only be determined as they are executing. Whether the application is data or task parallel, or static or dynamic parallel, it may be executed in a pipeline which is often the case for graphics applications.

Certain computing systems, such as a single-instruction, multiple-data (SIMD) processor, are particularly adept at executing data parallel applications. A pipeline control unit in the SIMD processor creates groups of threads of execution and schedules them for execution, during which all threads in the group execute the same instruction concurrently. In one particular processor, each group has 32 threads, corresponding to 32 execution pipelines, or lanes, in the SIMD processor.

Consider a fork-join parallel programming model such as OpenMP or OpenACC implemented on a parallel processing computing system. In this model, some parts of a program's code are executed by only one thread (a "master" thread) while other parts are executed by multiple threads in parallel ("worker" threads). Execution starts with only the master thread active. At a work creation construct, execution is forked when the master thread activates worker threads and assigns each worker an "execution task," such as a certain number of iterations of a loop. Worker threads then typically execute their assigned tasks in parallel. Once the worker threads are finished, they deactivate, and execution is joined when the master thread resumes execution of the remainder of the program code. The period of program execution when only one thread is active will be referred to herein as the sequential region or phase, and the period of program execution when more than one thread is active will be referred to herein as the parallel region or phase.

In many fork-join models, including OpenMP and OpenACC, data objects allocated in the sequential region can be accessed in the parallel region. Accordingly, parallel processor architectures provide memory for storing the data objects to which multiple threads may gain access during their execution. This memory may be characterized by many properties, including size, latency, volatility and others and their accompanying advantages and disadvantages.

SUMMARY

One aspect provides a system for allocating shared memory of differing properties to shared data objects and a hybrid stack data structure. In one embodiment, the system includes: (1) a hybrid stack creator configured to create, in the shared memory, a hybrid stack data structure having a lower portion having a more favorable property and a higher portion having a less favorable property and (2) a data object allocator associated with the hybrid stack creator and configured to allocate storage for shared data object in the lower portion if the lower portion has a sufficient remaining capacity to contain the shared data object and alternatively allocate storage for the shared data object in the higher portion if the lower portion has an insufficient remaining capacity to contain the shared data object.

Another aspect provides a method of allocating shared memory of differing properties to shared data objects. In one embodiment, the method includes: (1) creating a hybrid stack data structure in the shared memory, the data structure having a lower portion having a more favorable property and a higher portion having a less favorable property, (2) when a thread requires a shared data object, (2a) allocating storage for the shared data object in the lower portion if the lower portion has a sufficient remaining capacity to contain the shared data object and (2b) alternatively allocating storage for the shared data object in the higher portion if the lower portion has an insufficient remaining capacity to contain the shared data object and (3) when no thread further requires the shared data object, deallocating the storage.

Yet another aspect provides a hybrid stack data structure. In one embodiment, the data structure includes: (1) a lower portion in a shared memory having a more favorable property and (2) a higher portion in the shared memory having a less favorable property.

BRIEF DESCRIPTION

Reference is now made to the following descriptions taken in conjunction with the accompanying drawings, in which.

DETAILED DESCRIPTION

Figure 1:
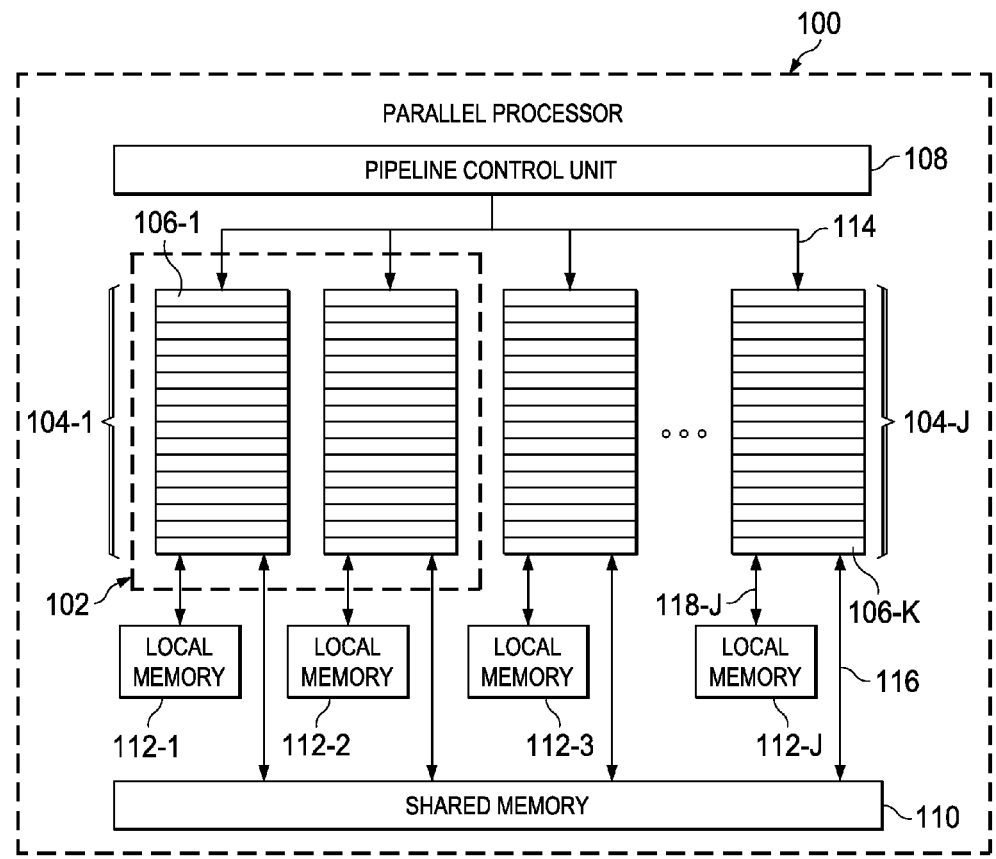
FIG. 1 is a block diagram of a parallel processor operable to contain or carry out a system or method for allocating memory of differing properties to shared data objects.

As stated above, parallel processor architectures characterize by many properties. For example, memory may be stratified into larger memory having a higher latency and smaller (perhaps by an order of magnitude) memory having a lower latency. Architectures often include several memory blocks having various properties and purposes. Multiple threads often need to gain access to this memory to share data objects.

In many fork-join programming models, data objects allocated in the sequential region can be accessed in the parallel region. However, on some execution platforms, thread-local memory is not accessible by other threads. For example, in some commercially available graphics processing units (GPUs), data objects resident in one thread's local memory are not accessible to a different thread. Hence a compiler or runtime system that translates a software program into executable form is tasked with the responsibility of allocating memory to potentially shared objects such that they are accessible by threads active in the parallel region.

Data objects allocated during the sequential region, that are local to a function, can be conveniently placed on a stack data structure. However, it is realized herein that implementing a stack data structure for shared data objects in only one type of memory (e.g., only global-shared memory, or only block-shared memory) has disadvantages. If the stack data structure were to be placed entirely in block-shared memory, which tends to be smaller, the stack could easily overflow, and the program would need to terminate. On the other hand, if the stack data structure were to be placed entirely in global-shared memory, which tends to be of higher latency, the performance of the program would degrade if access to the shared objects was heavy, since average access latency would increase. This could be particularly deleterious were a program to have only a few small shared objects.

Introduced herein are various embodiments of a system and method for allocating memory of differing properties to shared data objects. The system and method embodiments are generally directed to construct a hybrid stack data structure, that is, a stack data structure implemented with multiple types of physical memories. The system and method embodiments take advantage of the strengths of each type of memory, resulting in a mechanism that is less restrictive and achieves higher performance than possible when using only one type of memory. For example, in certain embodiments the hybrid stack affords the latency advantage of using block-shared memory when relatively few objects are allocated on the stack, which is often the case. However, a hybrid stack affords robustness if many large objects are allocated on the stack, by gracefully "falling back" to using higher latency global-shared memory.

Various embodiments of the system and method are employable in any conventional or later-developed parallel programming system where shared objects are accessed by multiple threads and the execution substrate provides multiple physical memories with differing resource limits and performance characteristics.

In some embodiments, the memory segments are configurable, e.g., as a compile-time or run-time parameter. This allows users to decide how best to balance memory resource usage and program performance. For instance, allocating more objects in the block-shared memory segment typically reduces average access latency and thereby increases program performance. Similarly, in certain embodiments, the size of each layer of the hybrid stack is configurable, the lowest layer being smallest, the next layer being larger, and the highest layer being largest yet.

Several embodiments will be illustrated and described below. Many of the illustrated and described embodiments may appear to be specific to hybrid stacks having segments located in two different memories. However, those skilled in the pertinent art will understand that many of these, together with other embodiments, are directed to hybrid stacks having more than two segments and therefore located in more than two memories. The invention is not limited in terms of the number of different memories that a hybrid stack can accommodate.

Before describing certain embodiments of the system and method, a parallel processor operable to contain or carry out a system and method for allocating memory of differing properties to shared data objects will be described.

FIG. 1 is a block diagram of a parallel processor 100. Parallel processor 100 includes multiple thread processors, or cores 106, organized into thread groups 104, or "warps." Parallel processor 100 contains J thread groups 104-1 through 104-J, each having K cores 106-1 through 106-K. In certain embodiments, thread groups 104-1 through 104-J may be further organized into one or more thread blocks 102. Certain embodiments include thirty-two cores 106 per thread group 104. Other embodiments may include as few as four cores in a thread group and as many as several tens of thousands. Certain embodiments organize cores 106 into a single thread group 104, while other embodiments may have hundreds or even thousands of thread groups 104. Alternate embodiments of parallel processor 100 may organize cores 106 into thread groups 104 only, omitting the thread block organization level.

Parallel processor 100 further includes a pipeline control unit 108, block-shared memory 110 and an array of local memory 112-1 through 112-J associated with thread groups 104-1 through 104-J. Pipeline control unit 108 distributes tasks to the various thread groups 104-1 through 104-J over a data bus 114. Cores 106 within a thread group 106-$j$ execute in parallel with each other. Thread groups 104-1 through 104-J communicate with block-shared memory 110 over a memory bus 116. Thread groups 104-1 through 104-J respectively communicate with local memory 112-1 through 112-J over local buses 118-1 through 118-J. For example, a thread group 104-J utilizes local memory 112-J by communicating over a local bus 118-J. Certain embodiments of parallel processor 100 allocate a shared portion of block-shared memory 110 to each thread block 102 and allow access to shared portions of block-shared memory 110 by all thread groups 104 within a thread block 102. Certain embodiments include thread groups 104 that use only local memory 112. Many other embodiments include thread groups 104 that balance use of local memory 112 and block-shared memory 110.

The embodiment of FIG. 1 includes a master thread group 104-1. Each of the remaining thread groups 104-2 through 104-J are considered "worker" thread groups. The master thread group 104-1 includes numerous cores, one of which is a master core 106-1, which ultimately executes a master thread. Programs executed on parallel processor 100 are structured as a sequence of kernels. Typically, each kernel completes execution before the next kernel begins. In certain embodiments, parallel processor 100 may execute multiple kernels in parallel, depending on the size of the kernels. Each kernel is organized as a hierarchy of threads to be executed on the cores 106.

In the following example, and without loss of generality, a GPU commercially available from Nvidia Corporation of Santa Clara, Calif., will be used as an execution platform and OpenACC will be used as a fork-join parallel programming model for programs. As described earlier, the Nvidia GPU provides global and shared memories that are both accessible by all threads that are part of the same thread block. Global-shared memory access latency is more than an order of magnitude higher than block-shared memory access latency. The size of global-shared memory is more than an order of magnitude larger than the size of block-shared memory. Table 1, below, sets forth an example of an OpenACC program in which threads in the parallel region access shared variables allocated in the sequential region.

TABLE 1

Example OpenACC Program

```
void bar(int *p2, int *p1)
{
    int i;
    #pragma acc loop worker
    for (i = 0; i < 1024*1024;++i) {
        p2[i] = *p1; //access shared variables "arr", "scalar"
    }
}
void foo(void)
{
    // only one thread in a group active here
    int arr[1024*1024];
    int scalar = 10;
    int *p2 = &arr[0];
    int *p1 = &scalar;
    bar(p2, p1);
}
void main(void)
{
    #pragma acc parallel num_groups(4) num_workers(10)
    {
        foo( );
    }
}
```

In the example program of Table 1, the fork and join parallel constructs are "pragma acc loop worker" and "pragma acc parallel," and the shared data variables are "arr" and "scalar."

The "pragma acc parallel" construct activates one master thread per "group," and the "pragma acc loop" activates other worker threads in a group. Before the other threads in a group are activated, only one thread of the group is active (master thread). Function "foo" is called by the master thread. The address of the variables function local variables "arr" and "scalar" is passed to function "bar", which activates the worker threads. The worker threads access the "arr" and "scalar" objects.

For correct execution, variables "arr" and "scalar" should be allocated in a memory area that is accessible by the worker threads. In this example, the variables are allocated on a hybrid data stack. The hybrid data stack is implemented using two pre-allocated buffers: one in block-shared memory and one in global-shared memory. A variable is allocated in the block-shared memory segment if there is space at the time of allocation to the hybrid stack. Otherwise it is allocated in the global-shared memory. Housekeeping information is maintained about the maximum sizes of the two segments, the currently active segment and the location within the active segment where the next stack allocation should be attempted.

Figure 2:
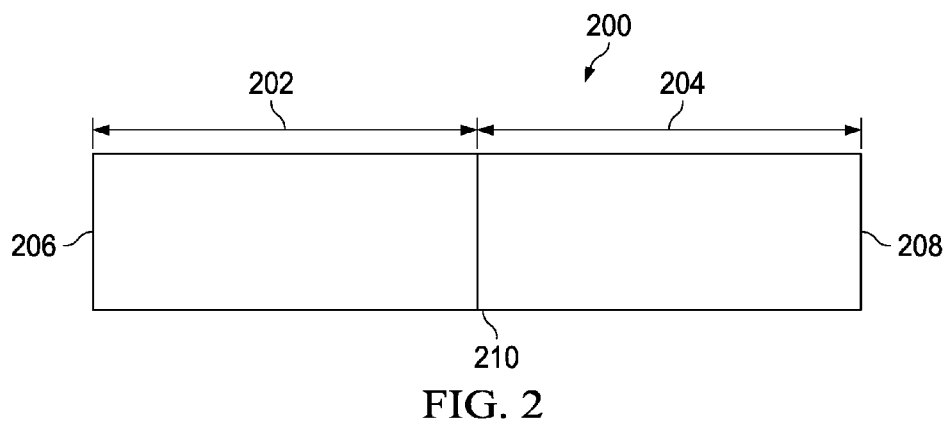
FIG. 2 is a diagram of one embodiment of a hybrid stack.

FIG. 2 is a diagram of one embodiment of a hybrid stack 200, having a lower portion 202 and a higher portion 204. In certain embodiments, lower portion 202 exists in a block-shared memory segment having a lower latency, and higher portion 204 exists in a global-shared memory segment having a higher latency. A stack bottom 206 exists in lower portion 202 and represents the first available, or lowest, memory address in hybrid stack 200. Likewise, a stack top 208 exists in higher portion 204 and represents the last available, or highest, memory address in hybrid stack 200.

Allocations are first made to stack bottom 206, in lower portion 202. As allocations increase, the lower portion fills until a maximum allocation in lower portion 210 is reached. Maximum allocation in lower portion 210 is essentially the boundary between the lower and higher, or in certain embodiments, the block-shared and global-shared, segments of the hybrid stack. In alternate embodiments the maximum allocation in in lower portion 210 is specified at run-time; and in others at compile-time. This specification is made by sizing the lower portion memory segments and higher portion memory segments to strike an appropriate balance of stack properties and performance, such as capacity and stack latency.

In certain embodiments employing memory of varying size and latency, it is often the case the hybrid stack 200 will not exceed the maximum allocation in lower portion 210; certain programs simply do not employ large enough amounts of data shared between threads to fill the smaller, lower-latency memory segment of the hybrid stack 200. When the lower portion 202 of hybrid stack 200 is filled, the next allocation to hybrid stack 200 is allocated in the lowest address of the higher portion 204. The term "lowest" refers to the position on hybrid stack 200 just above the maximum allocation in lower portion 210. As allocations continue to increase, the higher portion 204 fills and the overall latency of hybrid stack 200 climbs. As memory is deallocated from hybrid stack 200, the deallocations come first from the higher portion 204, the higher-latency global-shared memory segment. As memory continues to be deallocated, latency declines, the global-shared memory segment empties, eventually reaching the maximum allocation in lower portion 210, once again. Further deallocations then come from the lower portion 202, the block-shared memory.

Table 2, below, sets forth an implementation of a hybrid stack with a specific set of housekeeping variables. The pseudo-code for allocating and de-allocating variables from the hybrid stack is also given. The annotations "_shared_" and "_device_" indicate that the variable should be allocated in shared and global GPU memories, respectively. Note that this simplified implementation does not consider alignment requirements for the object being allocated on the stack.

TABLE 2

Example Hybrid Stack

```
#define SHARED_SEGMENT_SIZE 1024
#define GLOBAL_SEGMENT_SIZE (1024*1024)
__shared__ char shared_mem_segment[SHARED_SEGMENT_SIZE];
__device__ char global_mem_segment[GLOBAL_SEGMENT_SIZE];
char *shared_mem_top = &shared_mem_segment[0];
char *global_mem_top = &global_mem_segment[0];
bool using_shared_mem_segment = true;
```

In Table 2, "shared_mem_top" and "global_mem_top" indicate the position in the shared and global-shared memory segments where allocation should be attempted, respectively. "Using_shared_mem_segment" is a Boolean flag that indicates whether the block-shared memory segment should be used for allocation.

TABLE 3

Example Hybrid Stack Data Object Allocation Routine

```
// allocate on stack
char *allocate_on_hybrid_stack(size_t size)
{
    if (using_shared_mem_segment &&
        (shared_mem_top + size) <
        &shared_mem_segment[SHARED_SEGMENT_SIZE])
    {
        // allocate in block-shared memory segment
        char *result = shared_mem_top;
        shared_mem_top = result + size;
        return result;
```

TABLE 3-continued

Example Hybrid Stack Data Object Allocation Routine

```
    }
    // allocate in global-shared memory segment
    using_shared_mem_segment = false;
    char *result = global_mem_top;
    global_mem_top = result + size;
    return result;
}
```

TABLE 4

Example Hybrid Stack Data Object Deallocation Routine

```
// de-allocate from stack
void deallocate_from_hybrid_stack(size_t size)
{
    if (using_shared_mem_segment) {
        shared_mem_top -= size;
        return;
    } else {
        global_mem_top -= size;
        if (global_mem_top == &global_mem_segment[0])
            // switch back to block-shared memory segment
            using_shared_mem_segment = true;
    }
}
```

"Allocate_on_hybrid_stack" allocates memory in the block-shared memory segment if there is enough space in the block-shared memory segment; otherwise the object is allocated in the global-shared memory segment.

"Deallocate_from_hybrid_stack" adjusts the stack pointer in the appropriate memory segment and may switch back to using the block-shared memory segment if the global-shared memory segment is completely empty (i.e., no objects are presently allocated in that segment).

The allocation and deallocation of the block-shared memory from the hybrid stack happens only during the sequential region of the program, so there are no thread-safety issues during the allocation and deallocation.

Figure 3:
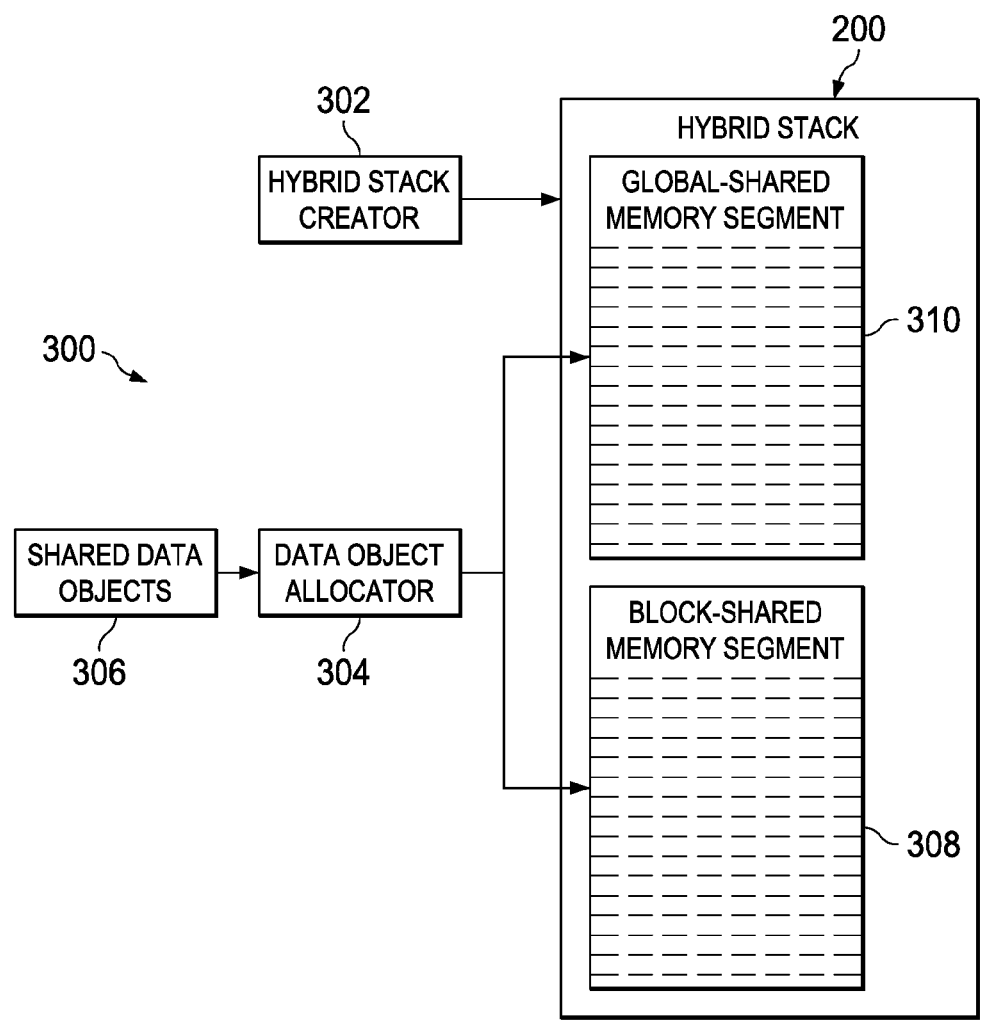
FIG. 3 is a block diagram of one embodiment of a system for allocating memory of differing latency to shared data objects.

FIG. 3 is a block diagram of one embodiment of a system 300 for allocating memory of differing latency to shared data objects 306. System 300 includes a hybrid stack creator 302 and a data object allocator 304. Hybrid stack creator 302 is configured to create hybrid stack 200 of FIG. 2. Hybrid stack 200, as illustrated in FIG. 3, includes a block-shared memory segment 308 and a global-shared memory segment 310, the lower and higher portion of FIG. 2.

Data object allocator 304 operates on shared data objects 306 to store shared data objects 306 in hybrid stack 200. In certain embodiments data object allocator 304 operates at compile-time, while in others data object allocator 304 operates at run-time. Data object allocator 304 favors allocating to block-shared memory segment 308. At the time of allocation, data object allocator 304 checks whether block-shared memory segment 308 has available capacity to store a data object. If capacity exists in block-shared memory segment 308, the data object is stored in block-shared memory segment 308. If no capacity exists in block-shared memory segment 308, the data object is stored in global-shared memory segment 310.

Figure 4:
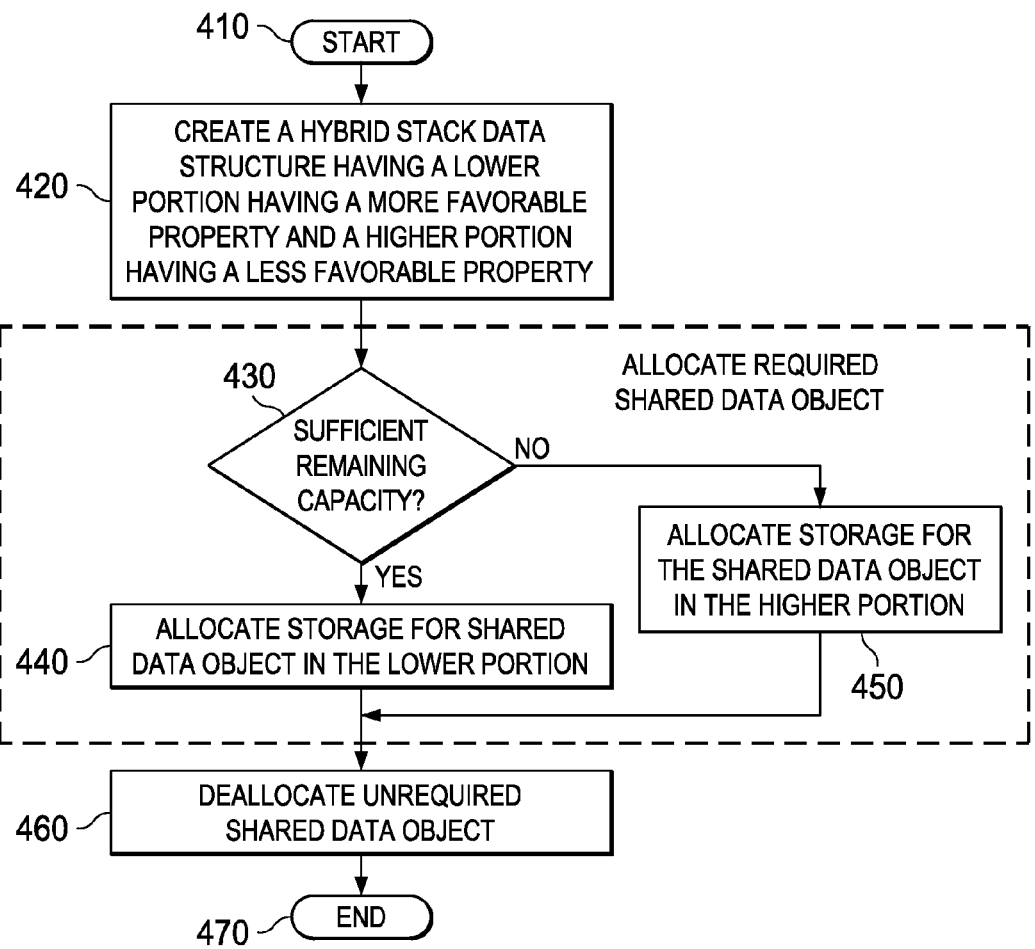
FIG. 4 is a flow diagram of one embodiment of a method of allocating memory of differing properties to shared data objects.

FIG. 4 is a flow diagram of one embodiment of a method of allocating memory of differing properties to shared data objects. The method begins in a start step 410. In a step 420, a hybrid stack data structure in shared memory, having a lower portion having a more favorable property and a higher portion having a less favorable property is created. At this point, allocations are made in the data structure for shared data objects required by any thread to be contained therein. Accordingly, in a decisional step 430, it is determined whether or not the lower portion has a sufficient remaining capacity to contain a given required shared data object. If so, storage for the shared data object is allocated in the lower portion in a step 440. If not, storage for the shared data object is alternatively allocated in the higher portion in a step 450. In a step 460, the storage is deallocated for any shared data objects no longer required by any thread to be contained in the data structure. The method ends in an end step 470.

Those skilled in the art to which this application relates will appreciate that other and further additions, deletions, substitutions and modifications may be made to the described embodiments.

What is claimed is:

1. A system for allocating shared memory of differing properties to shared data objects, comprising:
a processor;
said shared memory;
wherein said processor is configured to cause:
a hybrid stack creator to create, in said shared memory, a hybrid stack data structure having a first portion and a second portion having a property less favorable than a property of said first portion of said shared memory; and
a data object allocator associated with said hybrid stack creator to allocate storage for shared data object in said first portion if said first portion has a sufficient remaining capacity to contain said shared data object and alternatively allocate storage for said shared data object in said second portion if said first portion has an insufficient remaining capacity to contain said shared data object; wherein:
said shared data objects are allocated and deallocated only during a sequential region of program execution; and
said shared data objects are accessed only during a parallel region of said program execution.

2. The system as recited in claim 1 wherein said property is a latency of said shared memory.

3. The system as recited in claim 2 wherein said first portion is a block-shared memory, said second portion is a global-shared memory, and said system is operable in a parallel processing computing system having local memory.

4. The system as recited in claim 1 wherein a size of said first portion is at most an order of magnitude smaller than a size of said second portion.

5. The system as recited in claim 1 wherein sizes of said first and second portions are software-configurable.

6. The system as recited in claim 1 wherein said hybrid stack creator and said data object allocator are implemented in one selected from the group consisting of:
a compiler, and
a runtime system.

7. A method of allocating shared memory of differing properties to shared data objects, comprising:
creating a hybrid stack data structure in said shared memory, said data structure having a first portion and a second portion having a property less favorable than a property of said first portion of said shared memory;
when a thread requires a shared data object,
allocating storage for said shared data object in said first portion if said first portion has a sufficient remaining capacity to contain said shared data object, and alternatively allocating storage for said shared data object in said second portion if said first portion has an insufficient remaining capacity to contain said shared data object;
and
when no thread further requires said shared data object, deallocating said storage; wherein:
said allocating and deallocating occur only during a sequential region of program execution; and
said shared data objects are accessed during a parallel region of said program execution.

8. The method as recited in claim 7 wherein said property is a latency of said shared memory.

9. The method as recited in claim 8 wherein said first portion is a block-shared memory, said second portion is a global-shared memory, and said method is carried out on a parallel processing computing system having local memory.

10. The method as recited in claim 7 wherein a size of said first portion is at most an order of magnitude smaller than a size of said second portion.

11. The method as recited in claim 7 further comprising configuring sizes of said first and second portions.

12. The method as recited in claim 7 wherein said creating, said allocating and said deallocating are carried out by one selected from the group consisting of:
a compiler, and
a runtime system.

* * * * *